M. W. Pond.
Harness Shield.
N° 87,110.   Patented Feb. 23, 1869.
Fig. 1.     Fig. 2.
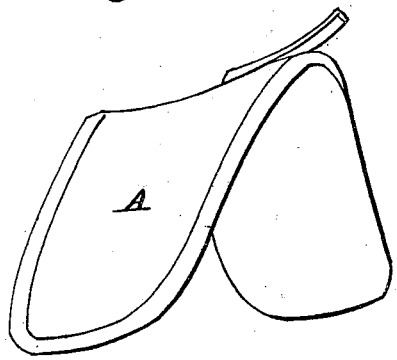 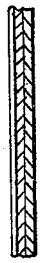
Fig. 3.
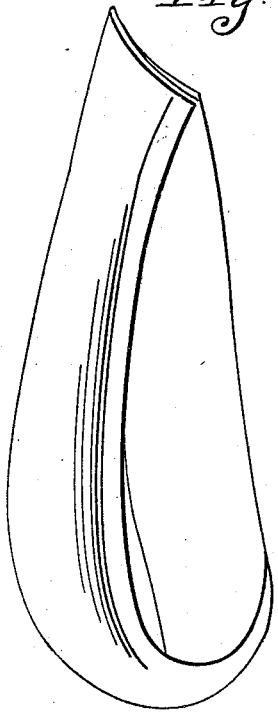
Witnesses:
H. F. Wilson
Ford T. Zollars
Inventor:
M. W. Pond

MARTIN W. POND, OF ELYRIA, OHIO.

Letters Patent No. 87,110, dated February 23, 1869.

IMPROVED SHIELD FOR HARNESS.

The Schedule referred to in these Letters Patent and making part of the same.

*To all whom it may concern:*

Be it known that I, MARTIN W. POND, of Elyria, in the county of Lorain, and State of Ohio, have invented certain new and useful Improvements in Shields for Pads for Harnesses, &c.; and I do hereby declare that the following is a full and exact description thereof, reference being had to the accompanying drawings, and to the letters of reference marked thereon, in which like letters refer to like parts in the different figures.

To enable others skilled in the arts to make and use my invention, I will proceed to describe its construction and operation.

In the drawings—

Figure 1 represents a perspective view of a housing for gig-saddle.

Figure 2 represents a sectional view of the same.

Figure 3 represents a view of a collar-housing.

The nature of my invention consists in interposing, between the bearing-surface of any harness or saddle-pad which is to be used on horses or other animals, a shield, composed of leather, on the one side, and having a bearing-surface, of gum-elastic, or other rubber compound, on the other side, said surfaces being attached to each other by stitches, or other equivalent means.

A represents a perspective view of a shield, for a gig-saddle, which is constructed in any suitable form, and of any desirable material.

The under or contact-surface of said shield is faced or covered with gum-elastic material, in such a manner that all of that portion which comes in contact with or bears upon the animal, is fully protected by said gum-elastic material, which renders it impervious to the moisture of perspiration.

Said lining or cover being elastic, readily adapts itself to any irregularity of surface, is not affected by heat or cold, will not wrinkle and cause ridges, is very durable, and possesses great medicinal or healing qualities, when used upon animals that have been severely galled.

This shield may be used with great advantage in various parts of a harness or riding-saddle, as, for instance, under a breast-collar, hames-collar, gig-saddle, or gig-saddle pad, or back-pad for any description of harness.

When used under a hames-collar, if closed at top and bottom, it will not be necessary to attach it to the collar, but when open at either top or bottom, it may be attached by any suitable means.

I am aware that rubber material has been used in the lining of collars; I therefore do not claim it for that purpose.

What I do claim as new, and desire to secure by Letters Patent, is—

As an article of manufacture, the shield herein described, composed of leather on one side, and having a bearing-surface of rubber, or rubber compound, on the other side, substantially as described.

M. W. POND.

Witnesses:
   FRED. T. ZOLLARS,
   H. F. WILLSON.